United States Patent [19]

Bavis

[11] Patent Number: 5,054,605
[45] Date of Patent: Oct. 8, 1991

[54] FLEXIBLE DRIVE CONVEYOR SYSTEM

[76] Inventor: Edward F. Bavis, 201 Grandin Rd., Maineville, Ohio 45039

[21] Appl. No.: 501,610

[22] Filed: Mar. 29, 1990

[51] Int. Cl.$^5$ ............................................. B65G 25/00
[52] U.S. Cl. .................................. 198/750; 414/749; 186/26; 186/37; 186/53; 186/58
[58] Field of Search .................. 198/346.2, 468.6, 750, 198/834, 802; 414/749; 186/26, 34, 37, 41, 53, 58

[56] References Cited

U.S. PATENT DOCUMENTS

| | | | |
|---|---|---|---|
| 2,896,748 | 7/1959 | McClintock | 186/1 |
| 3,875,868 | 4/1975 | Martin | 104/244 |
| 4,010,824 | 3/1977 | Bavis | 186/1 |
| 4,093,065 | 6/1978 | Temme | 198/834 |
| 4,122,936 | 6/1978 | Johnson | 198/346.2 |
| 4,411,336 | 10/1983 | Anders | 186/37 |
| 4,624,359 | 11/1986 | Gross | 198/366 |
| 4,890,724 | 1/1990 | Loewenthal | 198/802 |
| 4,957,188 | 9/1990 | Bavis | 186/41 |

OTHER PUBLICATIONS

Patent Application Ser. No. 07/080,494, filed Jul. 31, 1987 for "Food Service System for Drive-In Restaurants", Edward F. Bavis.
Patent Application Ser. No. 07/249,704, filed Sep. 27, 1988 for "Conveyor System with Stabilized Conveyor Basket", Edward F. Bavis.

Primary Examiner—Joseph E. Valenza
Attorney, Agent, or Firm—Frost & Jacobs

[57] ABSTRACT

There is provided a conveyor system for conveying items and including a carrier for such items to be moved between at least two spaced-apart stations and a first guide track extending between the spaced apart stations. A flexible drive tape having a leading edge and a trailing edge is reciprocably mounted within the first guide track for moving the carrier between the spaced-apart stations, wherein the flexible drive tape is attached to the carrier adjacent the leading edge by a plurality of connectors. At least one of the connectors allows controlled relative movement between the tape and the carrier. A toothed cog wheel is preferably provided around a substantial portion of the periphery of which the drive tape is wound within a cog surround which at least partly encloses the cog wheel and the wound drive tape. The surround further includes a pair of tape peeler tips oppositely disposed adjacent the cog wheel to peel the tape away from the cog wheel as the wheel is rotated in use. The carrier is supported adjacent the first guide track as it is conveyed by the drive tape between spaced apart stations, and a second guide track is provided for receiving the trailing edge of the drive tape. In a preferred embodiment, docking members provide additional support for said carrier at the stations.

39 Claims, 7 Drawing Sheets

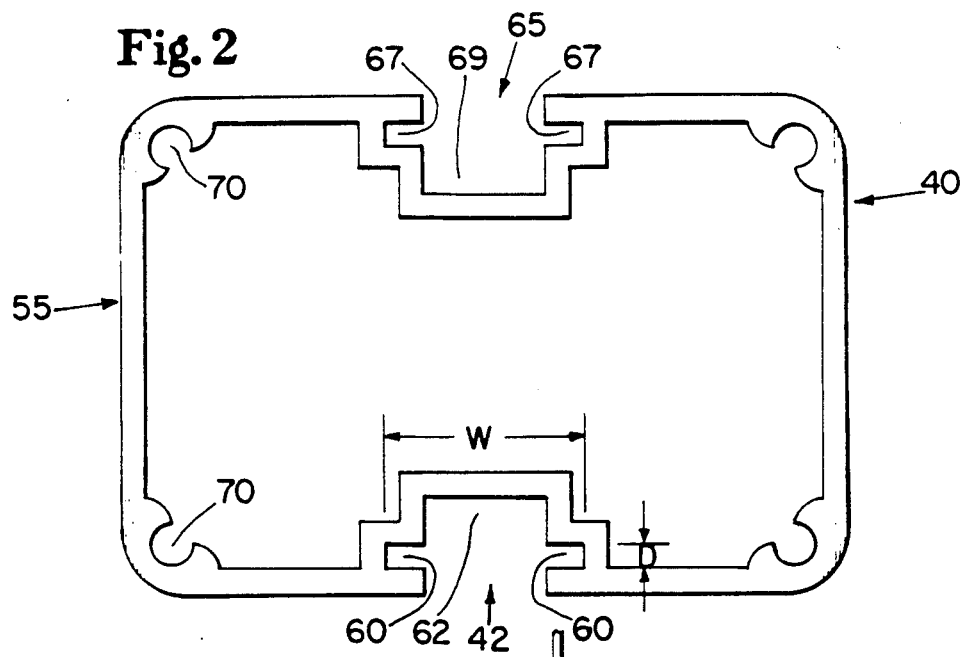
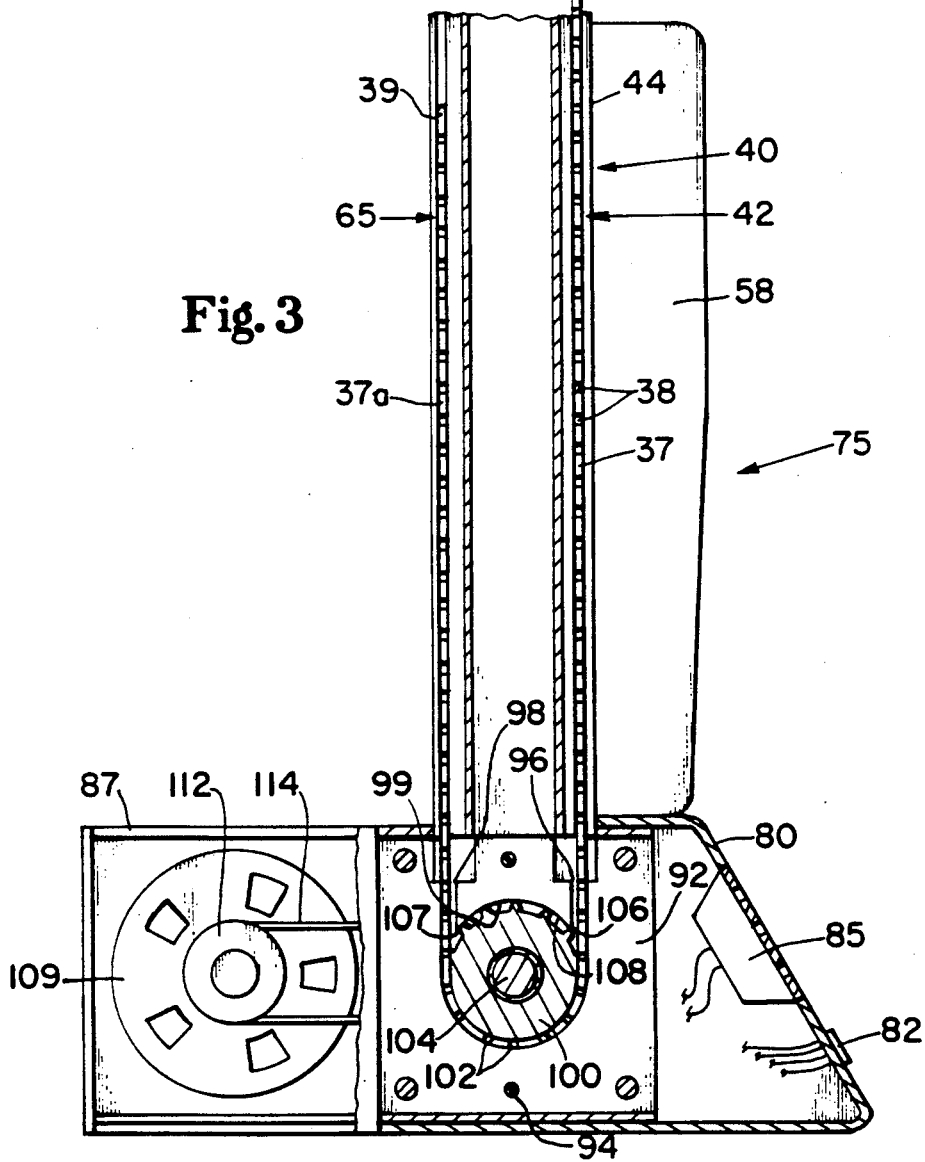

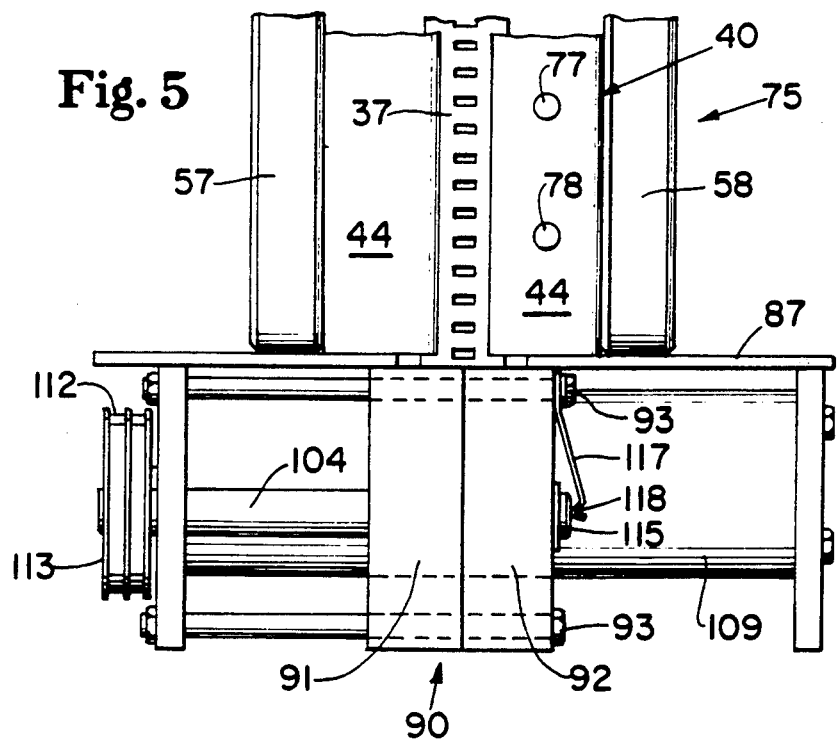
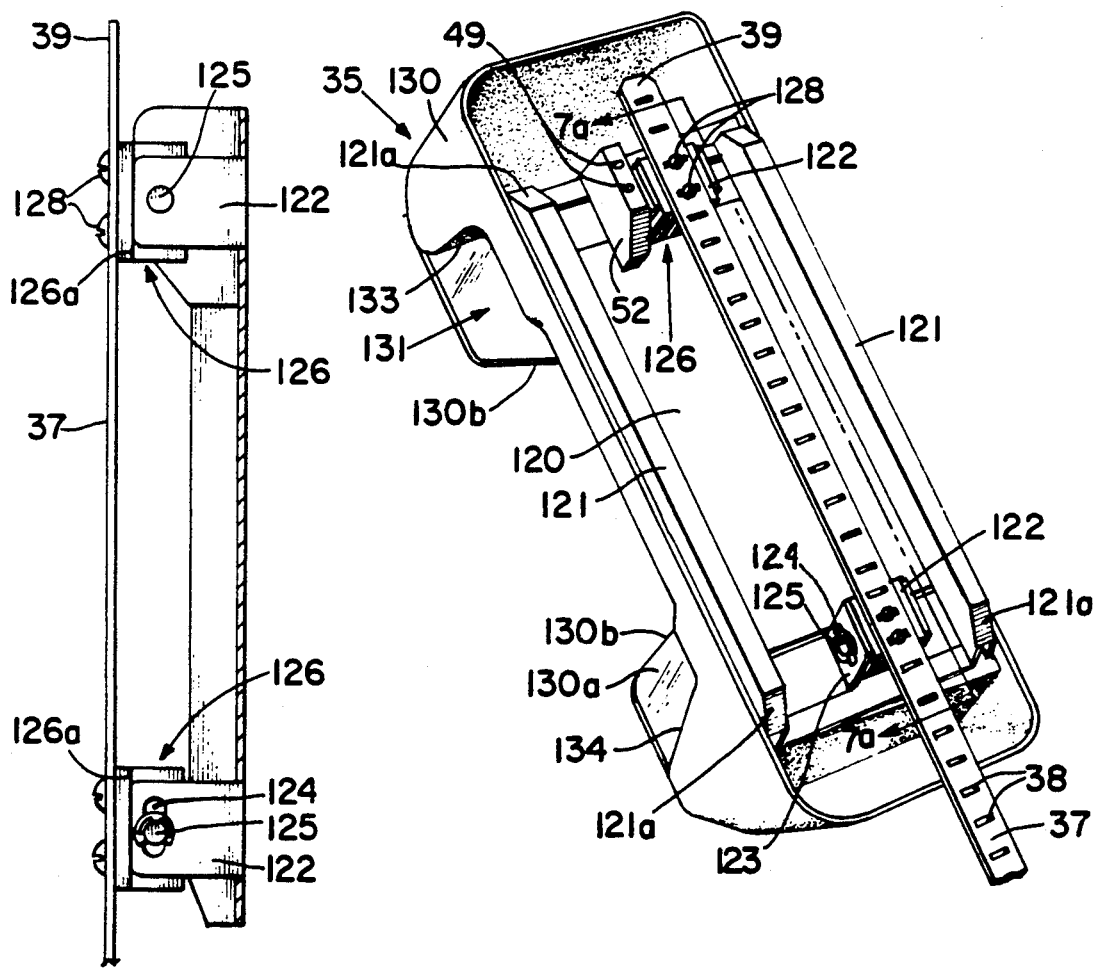

FLEXIBLE DRIVE CONVEYOR SYSTEM

TECHNICAL FIELD

This invention relates to a conveyor system for use in drive-in banks and similar remote transaction applications, and concerns an improved, simplified and more reliable conveyor system utilizing a flexible tape drive system to convey a carrier between two or more spaced apart receiving stations.

BACKGROUND OF THE INVENTION

In an increasingly wide variety of business applications, it is desirable and necessary to convey items such as cash and currency, documents, food, messages and other items between spaced apart stations. For example, various devices for conveying items between a plurality of stations have been shown in this inventor's previous U.S. Pat. No. 4,010,824 entitled "Conveyor System For Drive-In Banks And The Like", issued Mar. 8, 1977; as well as pending U.S. patent application Ser. No. 07/080,494, filed Jul. 31, 1987 and entitled "Food Service System For Drive-In Restaurants", and application Ser. No. 07/249,704, filed Sept. 27, 1988 and entitled "Conveyor System With Stabilized Conveyor Basket". U.S. Pat. No. 4,010,824 discloses a belt-type drive-up conveyor system including a plurality of modules each having reversible conveying means which, when concurrently driven, convey a container between spaced apart stations.

The referenced co-pending patent applications pertain more particularly to conveyor systems including a basket-like carrier for transporting items through a housing extending vertically upwardly from a processing station, horizontally through a canopy overlying one or more drive-in lanes, and then vertically downward through a housing forming a part of the delivery station. The basket is suspended between an opposing pair of spaced apart drive members which define a path of travel for the carrier basket. While the drive means of these systems can be an opposing set of conveyor chains, drive belts or elastomeric drive tapes, these systems contemplate more complex arrangements for conveying items which must remain vertically oriented throughout the conveying movements, such as liquid containers, food items and the like.

Other transport and conveying systems available heretofore have employed various combinations of rail systems or similar cable-car drive systems which required relatively complex arrangements of rails and/or cables, and were accordingly unnecessarily expensive and difficult to install and maintain in reliable working condition. An example of a railway type transport system is shown in U.S. Pat. No. 4,411,336, which issued to W. Anders on Oct. 25, 1983. As shown in this reference, the Anders banking system contemplates a heavy duty railway transport system including a track which aligns and supports a self-propelled car therealong. Anders further discloses a relatively complex mechanism for maintaining a load-carrying container in upright condition along the length of the track, and a system of actuator switches to control the self-propelled car and the doors adjacent the respective customer and teller terminals. Similarly, U.S. Pat. No. 2,896,748, which issued to S. McClintock on Jul. 28, 1959, discloses a complex curb service device which utilizes a series of endless carrier chains to propel a carrier assembly having a series of guide rollers and angled guide rails or guide pieces along which the rollers are moved. Again, this system is quite complex, and requires the interaction of numerous moving parts and careful tensioning of the chain drive system in order to maintain proper function. U.S. Pat. No. 3,875,868 describes a relatively complex cable-car arrangement requiring aligned rails and an endless, tensioned cable arrangement.

In addition to the above referenced co-pending patent applications, there are other devices available which utilize flexible tape drive elements to avoid the utilization of endless drive systems which must be assembled and maintained in particularly tensioned arrangement for proper operation. U.S. Pat. No. 4,624,359, which issued to J. Gross on Nov. 25, 1986, contemplates a flexible drive system utilizing aligned guideways to control devices such as currency carriers in automatic bank teller machines for movement between various positions. Particularly, the Gross device utilizes flexible tape storage spools which temporarily windingly receive the excess length of the flexible tape which is driven by sprocket wheels located adjacent those storage spools. Tabs attached to the end of these flexible tapes enable attachment of a currency carrier device to be driven by the tapes. Reciprocating movement of the drive tapes moves the currency carrier to various positions and implements other mechanical operations within the automatic teller machine in order to dispense the currency as required.

The present invention responds to a need for a simpler, inexpensive yet reliable conveyor system for moving items between spaced apart stations in a quiet, efficient, and reliable manner.

DISCLOSURE OF THE INVENTION

It is an object of this invention to provide a conveyor system for conveying items between spaced apart stations in a simpler and more reliable manner.

It is also an object of the present invention to provide a conveyor system utilizing a length of flexible drive tape which is supported within a guide track for reciprocably moving a carrier between spaced apart stations, wherein the guide track can assume an almost unlimited variety of conformations.

It is another object of the present invention to provide a simplified conveyor system utilizing a flexible drive tape mounted within a guide track wherein a carrier is supported by the drive tape and portions of the guide track as it is reciprocated between spaced apart stations such that the system requires minimal parts for easy assembly and maintenance.

It is yet another object of the present invention to provide a unique conveyor system utilizing one or more flexible drive tapes to reciprocate a carrier along a guide track between spaced apart stations, wherein docking members are provided adjacent the spaced apart stations to receive the carrier and supplement its support while at the stations.

In accordance with one aspect of the present invention, there is provided a conveyor system for conveying items between spaced apart stations and including a carrier and a first guide track extending between the spaced apart stations. A flexible drive tape having a leading edge and a trailing edge is reciprocably mounted within the first guide track for moving the carrier between the spaced apart stations, wherein the flexible drive tape is attached to the carrier adjacent the leading edge by a plurality of connectors. At least one of the connectors allows controlled relative movement between the tape and the carrier. A toothed cog wheel is preferably provided, wherein the drive tape is wound around the periphery of the toothed cog wheel at least 120° within a cog surround which at least partly encloses the cog wheel and the wound portions of the drive tape. The surround further includes a pair of tape peeler tips oppositely disposed adjacent the cog wheel to peel the tape away from the cog wheel as the wheel is rotated in use. The carrier is supported adjacent the first guide track as it is conveyed by the drive tape between spaced apart stations, and a second guide track is preferably provided for receiving the trailing edge of the drive tape. The second guide track is preferably located adjacent and substantially parallel to the first guide track along at least a portion of its length.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

FIG. 2 is an end view of a preferred guide track structure for the conveyor system illustrated in FIG. 1;

FIG. 3 is a partial vertical cross-sectional view of a teller station of the conveyor system such as shown in FIG. 1;

FIG. 5 is a partial front elevational view of the teller station of FIG. 4, with the operating controls cover removed;

FIG. 7 is a partial perspective view of a preferred carrier of the conveyor system shown in FIG. 1, showing details of the attachment of the flexible drive tape to the carrier;

FIG. 7a is a partial side elevational view of the drive tape and tape attachment blocks shown in FIG. 7;

DETAILED DESCRIPTION OF THE INVENTION

Figure 1:
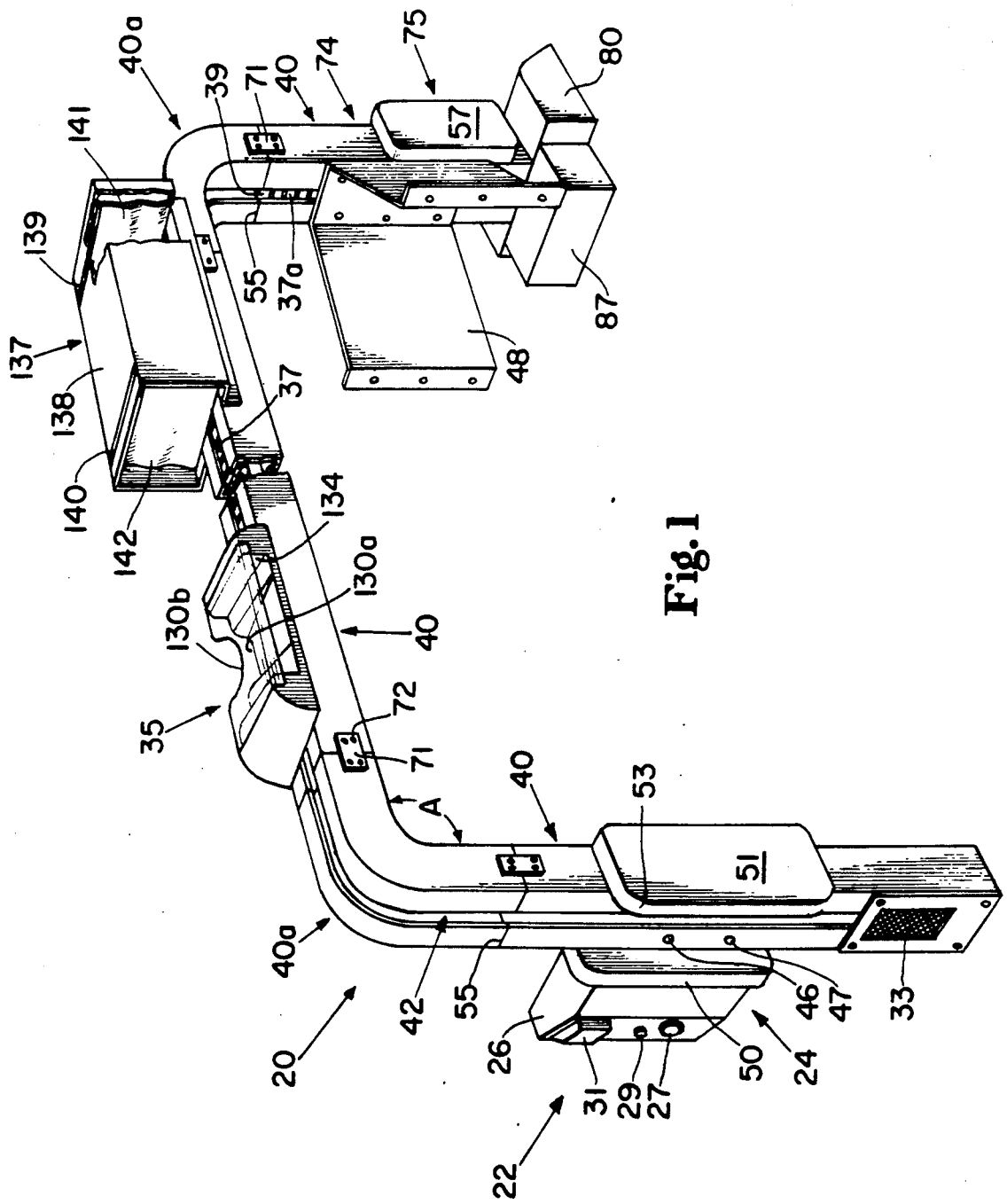
FIG. 1 is a fragmentary perspective schematic view illustrating a preferred embodiment of the conveyor system of the present invention.

Referring now to the drawings in detail, wherein like numerals indicate the same elements throughout the views, FIG. 1 illustrates a preferred embodiment of a conveyor system 20 made in accordance with the present invention. Particularly, conveyor system 20 comprises a customer section 22 having a customer station 24. As will be explained, in a preferred embodiment conveyor system 20 comprises a plurality of successive sections of guide track 40 connected along adjacent joints or edges 55 between spaced apart stations (e.g. customer station 24 and operator or teller station 75).

Conveyor system 20 is illustrated as comprising a substantially straight guide track section 40 associated with customer section 22 and attached to a curved guide track section 40a, which provides a curved portion having an included angle A. Guide track section 40a is, in turn, connected in alignment with another relatively straight section of guide track 40, which in turn is connected to a second bend portion 40a. The distal end of second bend portion 40a of the guide track is, in turn, connected at its distal edge in alignment with another relatively straight section of guide track 40 forming a portion of the operator section 74 which includes operator or teller station 75.

The end view of FIG. 2 illustrates the conformation of a preferred guide track 40 for use in conjunction with the conveyor system 20 of the present invention. Particularly, guide track 40 may be conveniently formed as by extrusion of one piece aluminum or aluminum alloy for strength and durability. Preferably formed integrally within the one piece guide track 40 is a first tape guide track 42 having oppositely disposed grooves 60 to provide an effective guide path of predetermined width W and depth D to slidably receive and support a flexible drive tape 37, as will be described herein. Width W and depth D should be chosen to permit unencumbered movement of tape 37, while restraining concomitant flexing and bunching of tape 37 under compression. Tape 37 will naturally tend to bend in a somewhat sinuous manner along the length of first guide track 42, and such bending should be limited to ensure that tape 37 does not actually fold upon itself and interfere with the operation of the system. Recess 62 is also preferably provided adjacent and rearwardly spaced relative first tape guide track 42 to provide clearance for means used to attach drive tape 37 to carrier 35, as will be described below.

A similar second tape guide track 65 is preferably formed on the opposite or rear surface of one-piece guide track 40 to slidably receive and support the excess length of drive tape 37 (designated as 37a) in use. Second tape guide track 65 similarly includes oppositely disposed grooves 67 and recess 69, although as will be understood, recess 69 can be omitted from guide track 65 if desired.

Preferably formed adjacent the outer periphery of joint or edge 55 are a plurality of guide track aligning slots 70. Slots 70 are merely illustrated as a preferred example for providing convenient means for alignment and attachment between contiguous sections of guide track 40 at a joint 55. It is contemplated that connector pins (not shown) would be inserted into slots 70 for alignment and attachment into corresponding slots 70 formed in the opposing edge 55 of another section of guide track 40 to be aligned. It is further contemplated that once two sections of guide track 40 are fitted into abutting alignment, additional securement means, such as plates 71 and screws 72, can be utilized to complete attachment of adjacent guide track sections.

It is contemplated that conveyor system 20 of the present invention can be advantageously utilized in various applications such as remote banking transactions or similar remote transactions such as submitting orders and/or payment for products or services. In such applications, it is often desirable to locate the operator section 74 of conveyor system 20 within a bank, restaurant, or other source of products and services, while the customer section 22 will be located at a remote location such as a drive-through customer island or service area. Mounting stand-off 48 is shown as a preferred example of a convenient manner for securing operator section 74 in an elevated or depending position for convenient access by the operator. It is contemplated that mounting stand-off 48 would be attached to the inside surface of a wall or support column within the bank or other business building. Such elevated mounting is also desirable to minimize the intrusiveness of conveyor system 20 and to save valuable floor space which is often at a premium in business applications.

Figure 4:
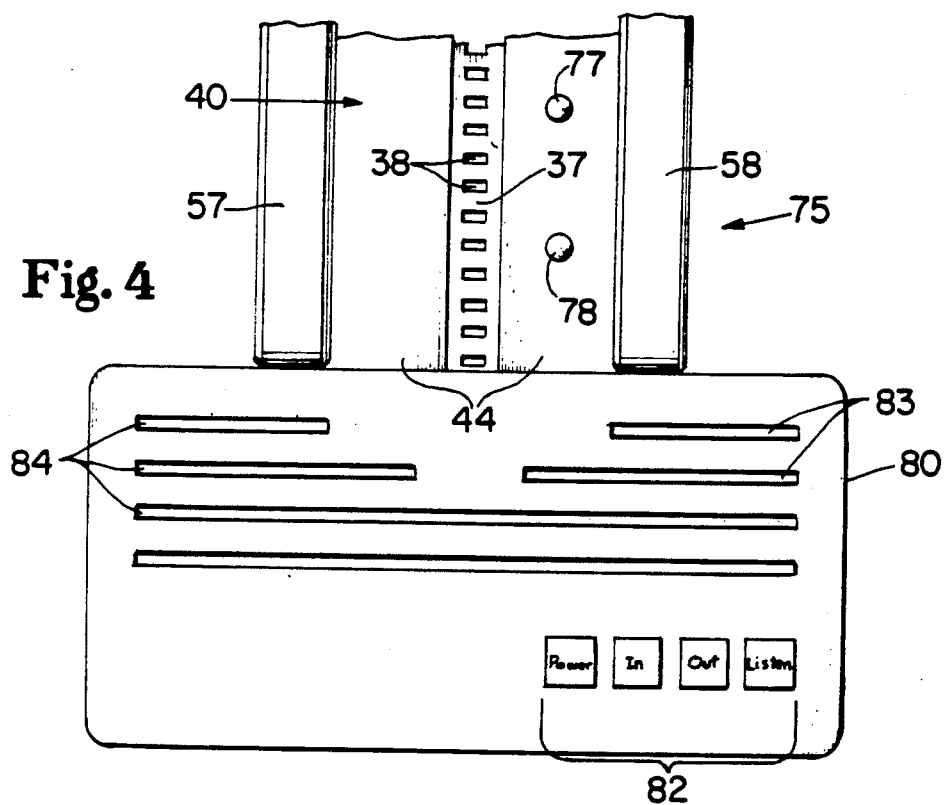
FIG. 4 is a partial front elevational view of the teller station of FIGS. 1 and 3.

Turning now to FIGS. 3–5, operator station 75 is illustrated as comprising the lower or distal portions of guide track 40 and a pair of oppositely disposed docking members 57 and 58 mounted along the opposite side edges of guide track 40. At the lower end of teller station 75 is mounted cover 80 (FIG. 4), which preferably includes operating controls 82 such as a power on/off switch, control switches for conveying carrier 35 out to customer station 24 and inwardly into teller station 75, as well as a monitor button for listening for instructions from a customer. Cover 80 may also include speaker openings 83 for an interiorly mounted speaker 85, as well as openings 84 for an interiorly mounted microphone. An adjustable, outwardly extending microphone (not shown) may also be preferred to obviate a need for the operator to speak loudly or direct his or her voice to an inconvenient location. Speaker 85 is illustrated best in FIG. 3.

Figure 6:
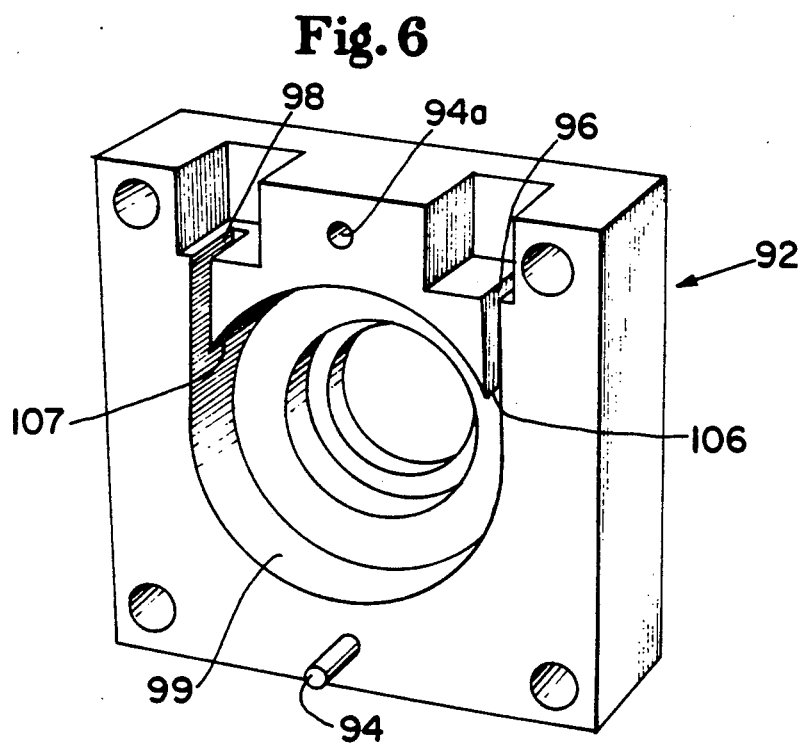
FIG. 6 is a perspective view of one half of the surround shell of the conveyor system illustrated in FIGS. 1, 3 and 5.

As best seen in FIG. 5, located rearwardly of cover member 80 and within motor housing 87 is surround 90 preferably made up of two mating halves 91 and 92, respectively, which may be aligned such as by corresponding pins 94 and openings 94a. As illustrated in FIGS. 3, 5 and 6, surround halves and 92 will preferably comprise a substantially cylindrical bore 99 for receiving and effectively enclosing cog wheel 100 and its outwardly disposed, radially spaced teeth 102. Cog wheel 100 will be mounted upon a drive shaft 104 which extends outwardly through surround half 91 and will be linked via pulley 113 to a corresponding pulley 112 attached to drive shaft 110 of reversible motor 109. Surround 90 will further preferably comprise a pair of oppositely disposed entrance/exit slots 96 and 98, respectively, for receiving and guiding flexible tape 37 into and out of surround 90. Bore 99 should be adequately sized to nicely receive cog wheel 100 and its outwardly extending teeth 102 without substantial interference. Surround 90 and cog wheel 100 and its teeth 102 can preferably be formed of lubric plastic or polymeric materials such as ultra high molecular weight plastic or the like. Consequently, surround 90 will be easy to mold and/or machine, and will not cause unusual or unnecessary wear on flexible drive tape 37 as it is driven by cog wheel 100.

Within the upper portions of surround halves 91 and 92, and adjacent entrance/exit slots 96 and 98, respectively, are peeler tips 106 and 107. Flexible drive tape 37 is preferably formed with a plurality of spaced apertures 38 which conform in shape and size to cog wheel teeth 102 such that rotation of cog wheel 100 within bore 99 causes teeth 102 to extend through successive apertures 38 to provide positive drive motion to tape 37. As illustrated in FIG. 7, drive tape 37 is attached adjacent its leading edge 39 to carrier back plate 120, and will be guided within first tape guide track 42 to convey carrier 35 between operator station 75 and customer station 24.

The trailing edge 36 (as seen in FIG. 3) of drive tape 37 is threaded into second tape guide track 65, which will guide and support the excess length of drive tape 37 (indicated at 37a) in use. For obvious reasons, the overall length of drive tape 37 should be sufficient to ensure that some excess tape 37a of drive tape 37 will always remain within second tape guide track 65, even when drive tape 37 is fully extended and has conveyed carrier 35 to the furthest remote station (e.g. customer station 24).

Consequently, rotational motion imparted by reversible motor 109 will be transmitted to drive shaft 104 via pulleys 112 and 113 and belts 114, and will cause drive tape 37 to be reciprocated within first tape guide track 42 to push carrier 35 from operator station 75 to customer station 24, or to pull carrier 35 from customer station 24 to operator station 75, as appropriate. One suitable material which can be utilized for drive tape 37 is "DYMETROL" tape as available from E.I. DuPont deNemours & Co. (Inc.) of Fayetteville, NC. By utilizing a flexible push/pull medium such as flexible tape 37, convenient reciprocating action can be provided to carrier 35 without a need for tedious tension adjustment of the drive mechanisms. Additionally, it has been found that if first and second tape guide tracks 42 and 65 are formed of relatively smooth, rigid materials such as anodized aluminum, no additional lubrication is necessary for continuous and reliable operation of flexible drive tape 37.

As best seen in FIGS. 3 and 6, drive tape 37 is relatively snugly engaged by teeth 102 and effectively sandwiched between cog wheel 100 and bore 99. Drive tape 37 is wound around a substantial portion of the periphery of cog wheel 100 to insure reliable driving interaction and to direct the excess portions 37a of drive tape 37 into the substantially parallel guide track 65. As a result of manufacturing tolerances and varying speeds of operation, it has been observed that drive tape 37 tends to adhere to the outer surface of cog wheel 100 as it is rotated, especially at higher speeds or under higher loads. Such adhesion can cause drive tape 37 to bind up or "fold" upon itself within surround 90, which may seriously impede the operation of conveyor system 20. By providing oppositely disposed peeler tips 106 and 107, it has been found that "folding" or binding of drive tape 37 within surround 90 (and especially within binding areas 108, shown in FIG. 3) can be substantially eliminated. It is preferred that peeler tips 106 and 107 be situated closely adjacent the opposite sides of cog wheel 100 at the positions nearest the outer diameter of teeth 102 where drive tape 37 must again assume a substantially longitudinal flat conformation in order to be guided through entrance/exit slots 96 and 98 into guide tracks 42 and 65, respectively. To best accomplish this continual peeling operation, it is preferred that peeler tips 106 and 107 assume a relatively knife-like depending conformation as best seen in FIG. 6.

Turning now to FIGS. 7 and 7a, drive tape 37 is preferably attached adjacent its leading edge 39 by a plurality of tape attachment blocks 126. As indicated, it is preferred that a pair of spaced tape blocks 126 which are attached to back plate 120 via pins 125 supported between a pair of outwardly extending tabs 122 and 123 be, in turn, attached such as by pan head screws 128 to tape 37 through apertures 38. It is further contemplated that at least one of the tape attachment blocks 126 may have its pin 125 located within an opposed pair of elongated slots 124 formed in a pair of tabs 122 and 123 on carrier back plate 120 to provide for a predetermined amount of longitudinal movement of the tape block relative back plate 120. In particular, the lower pair of tabs 122 and 123 are shown as providing mounting areas within which tape blocks 126 can be attached, yet allowing a predetermined amount of longitudinal and lateral (or "floating") movement of such attachment without significantly effecting the stability of carrier 35 as it is conveyed between stations.

Tape blocks 126 further provide sliding surfaces 126a which contact one or more carrier guide surfaces (e.g. 44) formed adjacent first tape guide track 42. As illustrated in FIGS. 2 and 5, it is preferred that carrier guide surfaces 44 be formed integrally adjacent first guide track 42 to provide a smooth and contiguous guide surface for carrier 35 along the length of conveyor system 20. It has been found that the interaction of carrier guide surfaces 44 with the sliding surfaces 126a provided by tape blocks 126 provide a substantially smooth and reliable support arrangement for carrier 35 as it is moved between spaced stations.

Moreover, an additional advantage of the present system lies in the fact that carrier 35 can be sufficiently supported for smooth, quiet and reliable reciprocation between spaced apart stations solely by its attachment to drive tape 37 and its sliding contact along one or more carrier guide surfaces 44. Flexible drive tape 37 enables the provision of driving force along guide tracks 40 which can assume an almost unlimited variety of curves, bends and substantially straight sections. Moreover, the substantially "floating" attachment of at least one of the tape attachment blocks 126 enables limited movement of the connections between drive tape 37 and carrier 35 to compensate for effective variations in the length of drive tape 37 as a result of curves and bends in guide track 42, as well as the natural tendency of drive tape 37 to assume a somewhat undulating configuration within guide track 42 when under compressive force.

As can be understood, in use, carrier 35 is reciprocated between spaced apart stations, such as operator station 75 and customer station 24, as a result of longitudinal force imposed upon drive tape 37 along first guide track 42 by reversible motor 109 via cog wheel 100. As illustrated best in FIG. 7, carrier 35 is contemplated as including an open item space 131 for receiving items to be conveyed. It is further preferred that carrier 35 include a cover 130, and that the opposite support surfaces 133 and 134 be slightly inclined inwardly to ensure that items are retained therewithin during transit. As illustrated, cover 130 may include a clear portion 130a having a shaped cutout portion 130b to facilitate a clear view into carrier 35 and to simplify manual insertion and withdrawal of items to be conveyed. It is further anticipated that some applications will preferably include a door or closure (not shown) on carrier 35 for additional security of items being conveyed.

Back plate 120 is also shown in FIG. 7 as including one or more position indicators 49 mounted on locator mount 52, which can be a mechanical trip switch or any of a variety of non-contact switches. It is contemplated that indicator 49 might preferably comprise a magnet which, when passing over non-contact switches such as indicated at 46 and 47 at customer station 24, will send a signal indicating the position of carrier 35 and, possibly, terminating rotational input of motor 109. In this regard, control sensors 46 and 77 are illustrated in FIGS. 1 and 4, respectively, to provide non-contact switches for stopping carrier 35 upon arrival at customer station 24 or operator station 75, respectively. Additionally, emergency control sensors 47 and 78 are also included as emergency backup switches to ensure that rotational force is not applied by motor 109 once carrier 35 reaches these points. Obviously, position monitoring and control of carrier 35 within conveyor system 20 can equally be accomplished with other mechanical switching devices, vision systems, or computer programming, as desired.

FIG. 1 illustrates an operating pod 26 situated adjacent customer station 24 for remote operation of conveyor system 20. Operating pod 26 preferably includes an operator call button 27 which would signal to the operator within the service building that a customer was present and desired to make a remote transaction. The customer is provided with a microphone 31 to speak to the operator, and a speaker 33 to listen for instructions and the like. Once carrier 35 has been conveyed to customer station 24 and the customer has placed the items to be conveyed within space 131, the operating button 29 can be utilized to initiate movement of carrier 35 to operator station 75.

It should also be noted that a pair of oppositely disposed docking members 50 and 51 have been provided adjacent customer station 24 and attached to the outer opposite edges of guide track 40. One or more docking members (e.g. 50 and 51) is preferably included to provide additional lateral support and stabilization for carrier 35 at customer station 24. As indicated above, guide track 40 and its carrier guide surface 44 can provide adequate and sole support for carrier 35 as it is conveyed between spaced apart stations however, docking members 50 and 51 are preferred at least at the customer station 24 to ensure maximum stability of carrier 35 during customer transactions. While it is also preferred to provide similar docking members 57 and 58 adjacent the operator station 75, it is believed that additional support and stability is less critical at the operator end of the transaction, as the operator will most likely be trained in the operation of the system and familiar with its operation.

Docking members 50 and 51 are preferably spaced at a predetermined distance to align with carrier 35 at the station via corresponding support ears 121 provided on opposite lateral edges of back plate 120 in order to provide substantial additional longitudinal and lateral support. This docking structure can also serve to prevent abuse of the system by customers unfamiliar with this operation and/or vandals. Tapered guide ramps 53 may be provided on the upper portions of docking members 50 and 51 to interact with corresponding angled ramps 121a of support ears 121 to ensure a smooth transition as carrier 35 rides up onto docking members 50 and 51 (and members 57 and 58 at the operator's station). Support ears 121 and docking members 50 and 51 are designed to hold carrier 35 in relatively firm alignment and support relative a respective station.

As also indicated in FIG. 1, conveyor 20 may preferably be enclosed within an outer skin or enclosure (e.g. enclosure 138). Regardless of whether the conveyor system itself is enclosed within an outer skin 138, at least a portion of conveyor system 20 will inevitably need to pass into a service building or similar structure. It is also generally preferred that an air lock structure 137 be provided to isolate the operator station 75 environment from the exterior (and often outdoor) environment of the remote customer station 24.

FIG. 1 illustrates a preferred air lock arrangement 137 comprising an outer skin or enclosure portion 138 having a pair of spaced slots 139 and 140, respectively, within which are mounted downwardly depending flexible air seals or curtains 141 and 142, respectively. The lower portions of outer skin 138 are preferably connected to the side edges of guide track 40, and the air seals or curtains 141 and 142 prevent the direct flow of air along the upper portions of conveyor system 20. Curtain 141 is preferably spaced from curtain 142 at a distance greater than the overall longitudinal length of carrier 35 so that at least one curtain will always be in sealing (downward) position. Other air lock devices (such as a curtain of air directed normal to the movement of carrier 35) could also be equally employed.

It has been observed that reciprocating motion of flexible drive tape 37 within tape guide track 42 and 65, and within surround 90, tends to build up static electricity under certain conditions. It has also been observed that the build up of static electricity can have adverse effects upon the lubrication of various bearings such as for drive shaft 104, and can severely limit the useful life of these parts. It appears that the static electricity causes electrical discharge which can effectively vaporize the grease within such bearings, causing them to break down and/or seize. Consequently, it is preferred to provide means for eliminating static electric charges from conveyor system 20, and surround 90 in particular. A preferred means for minimizing static electric build up within the system is shown in FIG. 5 as a biased grounding strap 117 having a V-shaped tip 118 arranged to contact the distal end 115 of drive shaft 104. Strap 117 can preferably be provided as a length of spring-type steel or similar conductive material, which can be conveniently grounded by attachment to one of the surround bolts (e.g. 93).

Figure 8:
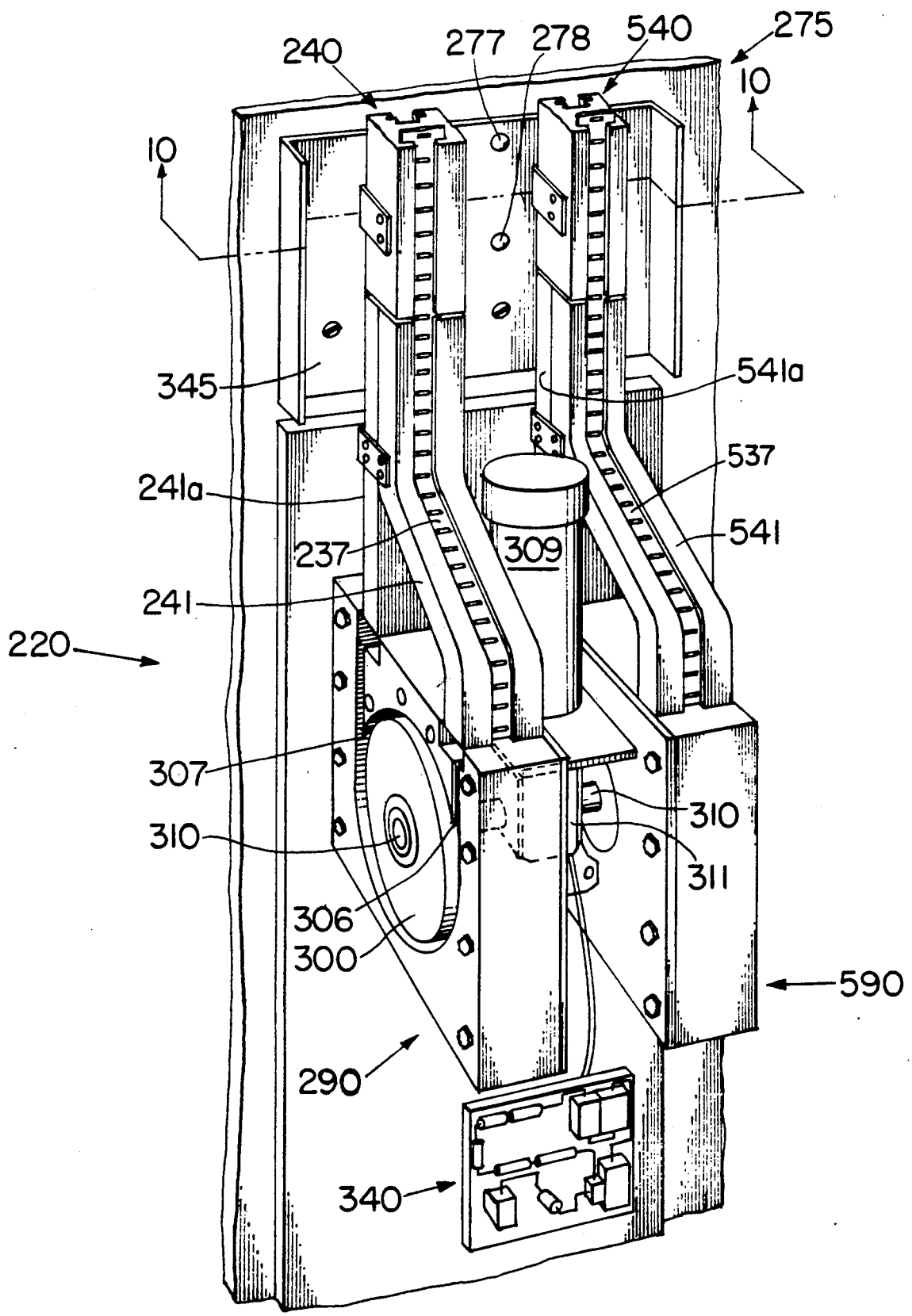
FIG. 8 is a partial perspective view of the drive system adjacent the operator's station of an alternate preferred embodiment of the conveyor system of the present invention, shown without a cover.
Figure 9:
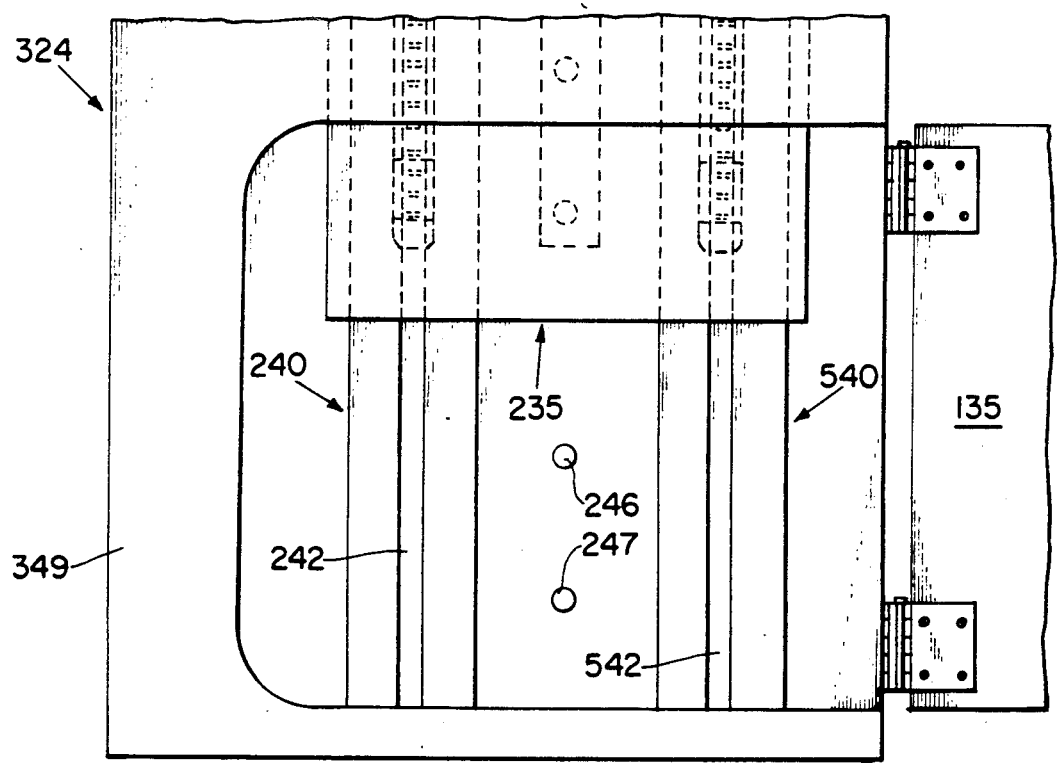
FIG. 9 is a partial front elevational view of the remote station of the conveyor system shown in FIG. 8.
Figure 10:
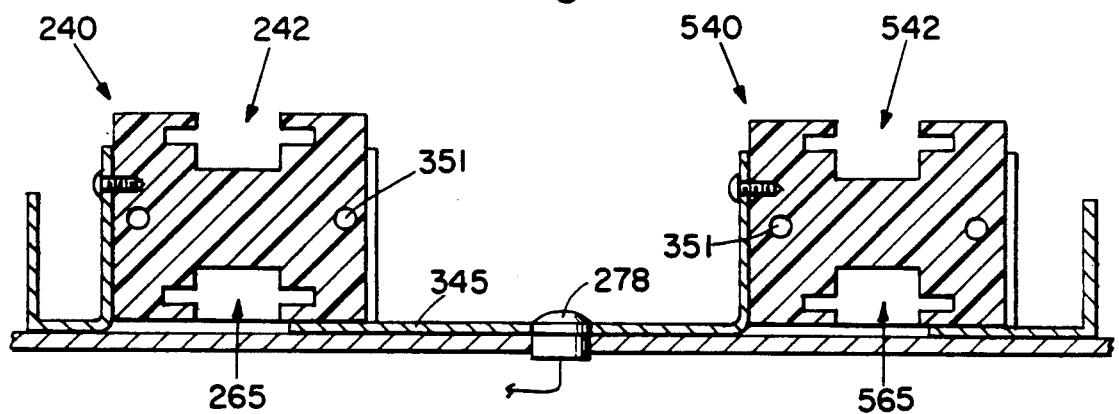
FIG. 10 is a cross-sectional view of the guide track assembly of the conveyor system shown in FIG. 8, taken along line 10—10 thereof.

An alternate preferred embodiment of the conveyor system of the present invention is shown in FIGS. 8–11. Particularly, conveyor system 220 is shown as including a pair of flexible drive tapes 237 and 537, respectively, driven by similar surround arrangements 290 and 590 of the type described above. It is contemplated that for applications requiring the transfer of heavier and/or larger items between spaced apart stations, it may be preferred to utilize a pair of spaced drive tapes and tape guide tracks. Particularly, a pair of spaced guide tracks 240 and 540, respectively, are shown in FIG. 8 as attached to a track mounting plate 345. As best seen in FIG. 10, it is contemplated that preferred guide track 240 and 540 may be integrally formed with first tape guide tracks 242 and 542, and second tape guide tracks 265 and 565, respectively, as described above with regard to guide track 40. Like guide track 40, guide tracks 240 and 540 may be extruded of relatively smooth anodized aluminum, or ultra-molecular weight plastic materials.

Returning to FIG. 8, it is contemplated that for greater weights of items to be conveyed, drive tapes 237 and 537 may preferably be of a higher modulus material, such as DETP-X-285 "Dymetrol", as available from E.I. DuPont. It has also been found that when higher modulus drive tape is utilized, it is preferred that the toothed cog wheels (e.g. 300) mounted within surrounds 290 and 590, respectively, feature larger diameters to minimize the bending stress imposed upon the higher modulus tape. It has been found that bending drive tape 237 and 537 around diameters which are too small can precipitate cracking and/or fracturing of the tape which can cause the tape to prematurely deteriorate.

It had been observed that with a lower modulus drive tape 37 (e.g. Dymetrol 6771-8) and a cog wheel 100 having a root diameter of approximately 1 and ⅞ inches (4.8 cm), the tape is not stressed beyond its modulus of elasticity, and the tape can be reciprocated without deterioration. With the higher modulus drive tape preferred for use in applications where the load to be moved is larger (e.g. 25 pounds or more) a diameter of approximately 6 and ⅝ inches (16.8 cm) has been found to avoid stressing the tape beyond its modulus of elasticity.

Due to the larger diameter of cog wheel 300, it is also preferred that guide tracks 240 and 540 include shaped extensions (e.g. 241 and 541) which guide the tapes into appropriate entrance/exit slits of surrounds 290 and 590, respectively. Surround 290 is illustrated with the peeler tips 306 and 307 as described above with regard to surround 90. Similarly, the tape drive arrangement would correspond to that described above. Because of the unique nature of the shaped adapters or extensions 241 and 541 for first tape guide track 242 and 542, respectively, it is preferred that extensions 241 and 541 be provided as separate pieces from the lower portions of second tape guide track 241a and 541a, respectively.

As shown in FIG. 8, the lower, separate portions of first guide track 242 and 542 are preferably aligned in abutted relationship to the lower ends of guide tracks 240 and 540, respectively. It has been found that some space should be left between adjacent aligned portions of the guide tracks along track mounting plate 345 to accommodate for differing coefficients of expansion and contraction of the materials which are used to form mounting plate 345 (e.g. galvanized steel) and guide tracks 240 and 540 (e.g. ultra high molecular weight plastic). As indicated in FIG. 10, it is preferred that guide track 240 and 540 be provided with alignment guides, such as pins 351, for insertion into corresponding alignment holes in adjacent guide track sections.

Conveyor system 220 is shown as including a single reversible motor 309 which provides rotational energy to a common drive shaft 310 connected to the respective cog wheels (e.g. 300) mounted with surrounds 290 and 590, respectively. It is contemplated that rotational energy from motor 309 can be transmitted to drive shaft 310 by an appropriate gear box 311. A computerized control system 340 is illustrated in FIG. 8 merely as a preferred control system for a conveyor system made in accordance with the present invention. Above motor 309 would be the lower portions of the operator's station 275 of conveyor system 220. It is contemplated that while docking members may be utilized to provide additional stability for carrier 235 at operator station 275 or remote station 324, docking members may be less advantageous in a dual drive tape system, which will inherently add additional stability as a result of the spaced connection of carrier 235 to drive tapes 237 and 537.

FIG. 9 illustrates a partial front elevational view of a remote station 324 of conveyor system 220, showing carrier 235 partially within station 324. As described above, non-contact control switch 246 is provided to terminate the drive sequence when carrier 235 is properly located at remote station 324 (as would switch 277 at the operator station). Similarly, emergency stop sensors 247 and 278 (FIG. 8) are also provided, as described above with regard to sensors 47 and 78. Remote station 324 is also illustrated as including an optional outer skin or cover 349 and door 135.

Figure 11:
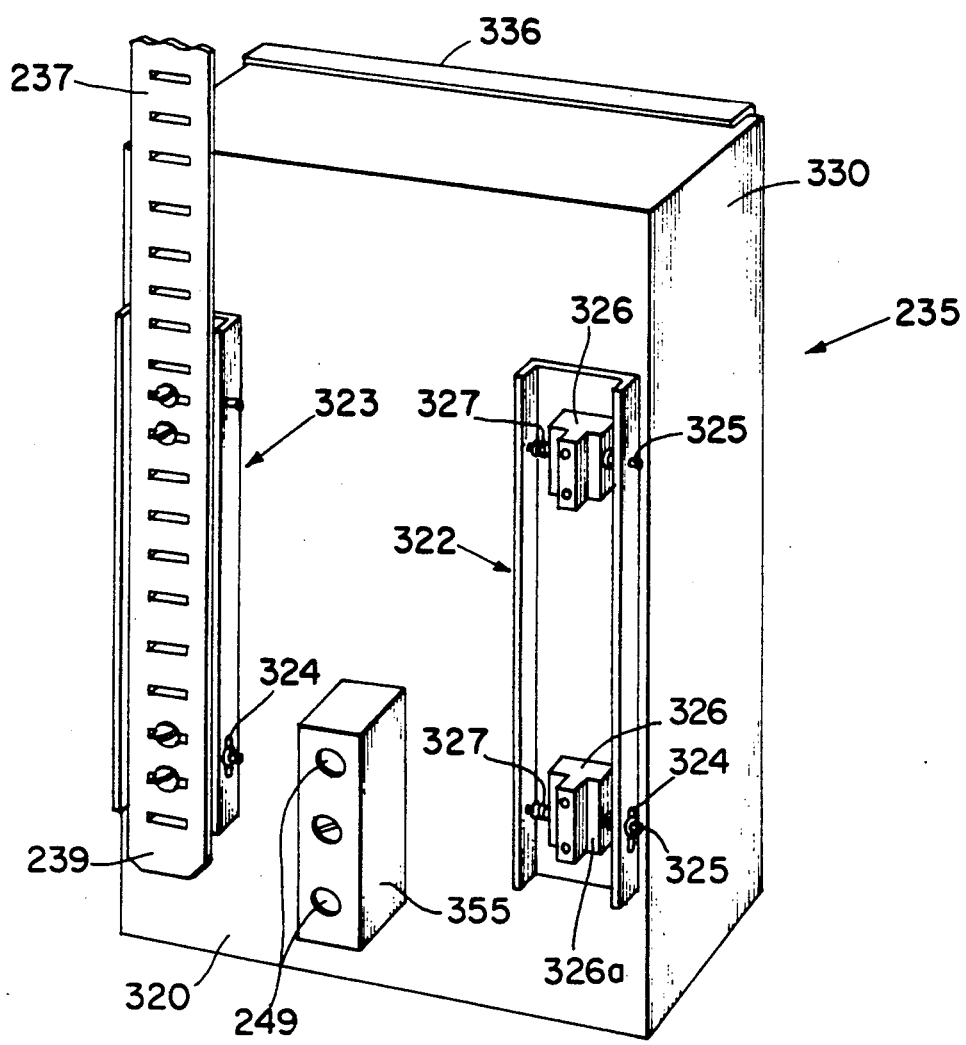
FIG. 11 is a rear perspective view of the carrier for the conveyor system shown in FIGS. 8-10, showing details of the adjustable attachment of the flexible tape drives.

As shown in FIG. 11, carrier 235 is similarly attached adjacent the leading edges (e.g. 239) of drive tapes 237 and 537 by a plurality "floating" tape attachment blocks 326, as described above. It is preferred that one or more of the tape attachment blocks 326 include adequate means for adjusting the tape blocks along retainer channels 322 or 323 to allow phasing of the tape connections to carrier 235 (i.e. to permit adjustment of the attachment of carrier 235 to the spaced tapes 237 and 537) to ensure that carrier 235 is properly aligned as desired. As illustrated in FIG. 11, this can be accomplished by the provision of longitudinally elongated slots 324 in retainers 322 and/or 323 within which will be supported a pin 325 to secure attachment block 326. Slots 324 will thereby provide for longitudinal adjustment/tolerance. Similarly, as illustrated, pins 325 may be adjustably mounted within retainer 322 and/or 323 by springs 327, to provide limited lateral movement of blocks 326, as desired. Springs 327 thus add the lateral dimension to the "floating" nature of the attachment of the tape blocks described herein.

Carrier 235 is further shown as including a cover 330 and a door or closure 336. Additionally, it is contemplated that one or more locator mounts, such as indicated at 355, are preferably attached to carrier back plate 320 for contacting track mounting plate 345 to provide additional stabilization and/or support for carrier 235 as it is conveyed between spaced-apart stations. Locator mount 355 is also illustrated as including several non-contact position indicators 249 (e.g. magnets) for interacting with non-contact sensors 246, 247, 277 and 278, as described above.

It should be noted that additional switches or sensor devices (whether of the contact or non-contact variety) might also be located at other predetermined positions along the guide track of a conveyor system made in accordance herewith in order to monitor the position of the carrier as it is reciprocated back and forth between spaced apart stations. Such additional sensing equipment could be utilized to vary the speed of a carrier, such that the carrier would move at slower speeds adjacent a station, while moving at faster speeds along remote sections of the conveyor system. Additionally, it may be desired to slow the carrier near abrupt curves or bends in the system, and such control could also be accomplished through various sensing mechanisms.

Having shown and described the preferred embodiments of the present invention, further adaptions of the conveyor system of the present invention can be accomplished by appropriate modifications by one of ordinary skill in the art without departing from the scope of the present invention. Accordingly, the scope of the present invention should be understood not to be limited to the details of structure and operation shown and described in the specification and drawings.

I claim:

1. A conveyor system for conveying items between spaced apart stations, said system comprising:
    a carrier to be moved between at least two spaced apart stations, said stations each providing user access to said carrier for insertion and withdrawal of items to be conveyed;
    a first guide track extending between said at least two spaced apart stations;
    a flexible drive tape having a leading edge and a trailing edge, and having said leading edge reciprocally mounted within said first guide track for moving said carrier between said spaced apart stations, said flexible drive tape being attached to said carrier adjacent said leading edge by a plurality of connectors, at least one of said connectors allowing controlled relative movement between said tape and said carrier;
    a second guide track extending substantially parallel to and along at least a portion of said first guide track for longitudinally guiding and supporting said trailing edge and excess length of said drive tape;
    means for driving said drive tape, said driving means comprising a toothed cog wheel and a cog surrounding at least partially enclosing said cog wheel and drive tape therein, said surround further comprising a pair of tape peeler tips situated closely adjacent opposite sides of said cog wheel to peel said tape away from said cog wheel as said wheel is rotated in use, said drive tape being wound around a substantial portion of the periphery of said cog wheel for driving interaction, and extending from opposite sides thereof into said first and second guide tracks, respectively; and
    means for supporting said carrier adjacent said first guide track as it is conveyed by said drive tape between stations.

2. The conveyor system of claim 1, wherein said first guide track comprises a substantially continuous groove having a predetermined width and depth which closely corresponds to the width and thickness of said flexible drive tape, said groove width and depth dimensioned so as to be slightly larger than said tape width and thickness to provide substantially unimpeded reciprocation of said tape within said groove and sufficiently snug to prevent folding or excessive bunching of said tape therewithin in use.

3. The conveying system of claim 1, wherein one of said connectors is a slotted pinned connection which permits relative movement between said carrier and drive tape to accommodate stresses resulting from conveying said carrier around turns along the guide track.

4. The conveying system of claim 1, wherein said tape wraps around at least 120 degrees of the periphery of said cog wheel and said surround substantially encloses said wheel and the portion of said tape wrapped around said wheel.

5. The conveying system of claim 1, wherein said means for supporting said carrier adjacent said first guide track comprises a relatively flat support surface having a centrally located opening along its length within which is located said connectors attaching said carrier to said drive tape.

6. The conveyor system of claim 1, wherein said peeler tips comprise substantially knife-like peeling edges located adjacent said cog wheel to facilitate guidance of said tape toward said first and second guide tracks, respectively.

7. The conveyor system of claim 1, wherein said means for supporting said carrier comprises a carrier guide surface located adjacent said first guide track along substantially the entire length of said first guide track between said spaced apart stations, wherein said carrier is supported solely by said guide surface and said drive tape attached to said carrier as it is conveyed between said stations.

8. The conveyor system of claim 7, further comprising additional means for supporting said carrier adjacent at least one of said stations during user access, said additional means comprising at least one docking member attached adjacent said first guide track and interacting with a portion of said carrier at said station to provide firm alignment and support against movement of said carrier while at said station.

9. The conveyor system of claim 8, wherein said additional means for supporting said carrier comprises a pair of oppositely disposed docking members spaced at a predetermined distance to supportingly interact with said carrier at said station.

10. The conveyor system of claim 9, wherein said docking members are provided at each of said stations.

11. The conveyor system of claim 8, wherein said docking member further comprises a tapered guide ramp to facilitate interaction of said docking member with said portion of said carrier as said carrier is moved to said station.

12. The conveyor system of claim 9, wherein said docking members further comprise oppositely disposed tapered guide ramp portions for facilitating movement of said carrier onto supported position with said docking members as it is moved to said station.

13. The conveyor system of claim 1, further comprising means for removing static electric charges from said system.

14. The conveyor system of claim 13, wherein said means for removing static electric charges comprises a grounding strap.

15. A conveyor system for conveying items between at least two spaced apart stations, said system comprising:
   a carrier to be moved between at least two spaced apart stations, said stations each providing user access to said carrier for insertion and withdrawal of items to be conveyed;
   a first guide track extending between said at least two spaced apart stations;
   a flexible drive tape having a leading edge and a trailing edge and having said leading edge reciprocally mounted within
   said first guide track for moving said carrier between said at least two spaced apart stations, said flexible drive tape being attached to said carrier adjacent said leading edge by a plurality of connectors, at least one of said connectors allowing controlled relative movement between said tape and said carrier;
   means for driving said drive tape, said driving means comprising a toothed cog wheel around a substantial portion of the periphery of which said drive tape is wound, and a cog surround at least partially enclosing said cog wheel and said wound drive tape;
   a second guide track extending substantially parallel to and along said first guide track adjacent said driving means, and within which said trailing edge and excess length of said drive tapes is longitudinally guided and supported;
   means for supporting said carrier adjacent said first guide track as it is conveyed by said drive tape between stations; and
   additional means for supporting said carrier provided adjacent at least one of said stations, said additional supporting means comprising at least one docking member which interacts with said carrier at said station to limit movement of said carrier while at said station.

16. The conveyor system of claim 15, wherein said additional means for supporting said carrier comprises a pair of oppositely disposed docking members spaced at a predetermined distance from one another along said first guide track to supportingly interact with said carrier at said station.

17. The conveyor system of claim 16, wherein said docking members are provided at each of said stations.

18. The conveyor system of claim 17, wherein said docking members further comprise oppositely disposed tapered guide ramp portions for facilitating interaction of said carrier with said docking members as said carrier is moved to said station.

19. The conveyor system of claim 15, further comprising means for minimizing the buildup of static electric charges in said system.

20. The conveyor of claim 19, wherein said means for minimizing static electric buildup comprises a grounding strap functionally attached in conjunction with said cog wheel.

21. A conveying system of claim 15, wherein one of said connectors is a slotted pinned connection which permits relative movement between said carrier and drive tape to accommodate stresses resulting from conveying said carrier around bends along the guide track.

22. The conveying system of claim 15, wherein said carrier has an attachment surface having lateral and longitudinal dimensions, said flexible tape being attached adjacent said attachment surface in an orientation substantially parallel to said longitudinal dimension, and wherein said at least one connector provides for limited movement of said tape relative said carrier in a direction substantially parallel to said longitudinal direction.

23. The conveying system of claim 22, wherein said at least one connector provides for limited movement of said tape relative said carrier in a plurality of directions.

24. The conveying system of claim 15, further comprising a pair of flexible drive tapes and means for driving said drive tapes, said drive tapes mounted within a pair of substantially parallel first guide tracks extending between said spaced apart stations, and said carrier being attached to said pair of flexible drive tapes by said plurality of connectors.

25. The conveyor system of claim 24, wherein said connectors are attached to an attachment plate of said carrier, said connectors providing an adjustable attachment of said pair of drive tapes relative one another to ensure proper alignment of said carrier along said first guide track.

26. A conveyor system for conveying items between at least two spaced apart stations, said system comprising:
   a carrier to be moved between at least two spaced apart stations, said stations each providing user access to said carrier for insertion and withdrawal of items to be conveyed;
   a first guide track extending between said at least two spaced apart stations;
   a pair of spaced flexible drive tapes each having a leading edge and a trailing edge and having said leading edge reciprocally mounted within said first guide track for moving said carrier between said at least two spaced apart stations, said flexible drive tapes being attached to said carrier adjacent said leading edge by a plurality of connectors, at least one of said connectors allowing controlled relative movement between said tapes and said carrier;

means for driving said drive tapes, said driving means comprising a pair of toothed cog wheels around each of which a substantial portion of the periphery of a drive tape is wound, and a cog surround at least partially enclosing each said cog wheel and said wound drive tape;

a second guide track extending substantially parallel to and along said first guide track adjacent said driving means, and within which said trailing edge and excess length of said drive tapes is longitudinally guided and supported; and means for supporting said carrier adjacent said first guide track as it is conveyed by said drive tape between stations.

27. The conveyor system of claim 26, wherein said connectors are attached to an attachment plate of said carrier, said connectors providing adjustability of the attachment of said pair of drive tapes relative one another to ensure proper alignment of said carrier along said first guide track.

28. The conveying system of claim 26, wherein said at least one connector provides for limited movement of said tape relative said carrier in a plurality of directions.

29. The conveyor system 26, further comprising means for minimizing the buildup of static electric charges in said system.

30. The conveyor system of claim 26, wherein said additional means for supporting said carrier comprises a pair of oppositely disposed docking members spaced at a predetermined distance from one another to supportingly interact with said carrier at said station.

31. The conveyor system of claim 30, wherein said docking members are provided at each of said stations.

32. The conveyor system of claim 31, wherein said carrier comprises one or more supporting ears which interact with said docking members to maintain said carrier in supported alignment at said stations.

33. The conveyor system of claim 31, wherein said docking members further comprise oppositely disposed tapered guide ramp portions for facilitating interaction of said carrier with said docking members as said carrier is moved to said station.

34. The conveyor system of claim 1, wherein said cog surround includes a pair of oppositely disposed slots for receiving and guiding said drive tape into and out of said surround, said slots being located along the upper portion of said surround and aligned with respective first and second guide tracks.

35. The conveyor system of claim 26, further comprising additional means for stabilizing said carrier as it is conveyed between said stations.

36. The conveyor system of claim 35, wherein said additional stabilizing means comprises at least one locator mount attached to a back plate of said carrier.

37. The conveyor system of claim 26, further comprising one or more sensor devices along said first guide track to monitor the position of said carrier as it is reciprocated back and forth between spaced apart stations.

38. The conveyor system of claim 1, further comprising one or more sensor devices along said first guide track to monitor the position of said carrier as it is reciprocated back and forth between spaced apart stations.

39. The conveyor system of claim 1, wherein said first and second guide tracks extend from said cog surround in a common direction and substantially parallel to one another.

* * * * *

UNITED STATES PATENT AND TRADEMARK OFFICE
CERTIFICATE OF CORRECTION

PATENT NO. : 5,054,605

DATED : October 8, 1991

INVENTOR(S) : Edward F. Bavis

It is certified that error appears in the above-identified patent and that said Letters Patent is hereby corrected as shown below:

Column 12 - Claim 1 - Line 17 - "rounding" should be deleted and replaced with --round--.

Column 13 - Claim 15 - Lines 43 and 44 - line 44 should appear directly after line 43.

Signed and Sealed this

Ninth Day of March, 1993

Attest:

STEPHEN G. KUNIN

*Attesting Officer*         *Acting Commissioner of Patents and Trademarks*